US006907143B2

United States Patent
Ferguson

(10) Patent No.: US 6,907,143 B2
(45) Date of Patent: Jun. 14, 2005

(54) ADAPTIVE SPATIO-TEMPORAL FILTER FOR HUMAN VISION SYSTEM MODELS

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 567 days.

(21) Appl. No.: 09/858,775

(22) Filed: May 16, 2001

(65) Prior Publication Data

US 2002/0186894 A1 Dec. 12, 2002

(51) Int. Cl.$^7$ .................................................. G06T 5/50
(52) U.S. Cl. ...................................... 382/261; 382/264
(58) Field of Search ................................ 382/260, 261, 382/264

(56) References Cited

U.S. PATENT DOCUMENTS

| | | | | |
|---|---|---|---|---|
| 4,551,753 A | * | 11/1985 | Nishizawa et al. | 348/446 |
| 5,394,483 A | * | 2/1995 | Daly | 382/270 |
| 5,473,384 A | * | 12/1995 | Jayant et al. | 348/470 |
| 5,687,101 A | * | 11/1997 | Lee | 702/190 |
| 5,799,111 A | * | 8/1998 | Guissin | 382/254 |
| 6,119,083 A | * | 9/2000 | Hollier et al. | 704/243 |
| 6,281,942 B1 | * | 8/2001 | Wang | 348/607 |
| 6,335,990 B1 | * | 1/2002 | Chen et al. | 382/261 |

FOREIGN PATENT DOCUMENTS

| JP | 07307925 A | * | 11/1995 | ............ H04N/7/01 |
|---|---|---|---|---|

OTHER PUBLICATIONS

T. Hamada, S. Miyaji and S. Matsumoto, "Picture Quality Assessment System by Three–Layered Bottom–Up Noise Weighting Considering Human Visual Perception", SMPTE Journal, Jan. 1999.

* cited by examiner

*Primary Examiner*—Daniel Miriam
*Assistant Examiner*—Dennis Rosario-Vasquez
(74) *Attorney, Agent, or Firm*—Francis I. Gray

(57) ABSTRACT

An adaptive spatio-temporal filter for use in video quality of service instruments based on human vision system models has a pair of parallel, lowpass, spatio-temporal filters receiving a common video input signal. The outputs from the pair of lowpass spatio-temporal filters are differenced to produce the output of the adaptive spatio-temporal filter, with the bandwidths of the pair being such as to produce an overall bandpass response. A filter adaptation controller generates adaptive filter coefficients for each pixel processed based on a perceptual parameter, such as the local average luminance, contrast, etc., of either the input video signal or the output of one of the pair of lowpass spatio-temporal filters. Each of the pair of lowpass spatio-temporal filters has a temporal IIR filter in cascade with a 2-D spatial IIR filter, and each individual filter is composed of a common building block, 5 i.e., a first order, unity DC gain, tunable lowpass filter having a topology suitable for IC implementation. At least two of the building blocks make up each filter with the overall adaptive spatio-temporal filter response having a linear portion and a non-linear portion, the linear portion being dominant at low luminance levels and the non-linear portion being consistent with enhanced perceived brightness as the luminance level increases.

13 Claims, 4 Drawing Sheets

ADAPTIVE SPATIO-TEMPORAL FILTER FOR HUMAN VISION SYSTEM MODELS

BACKGROUND OF THE INVENTION

The present invention relates to video processing, and more particularly to an adaptive spatio-temporal filter for human vision system models used in determining the quality of video service.

Video is recorded and transmitted via methods that may create errors, such as lossy compression systems and the like. It is of interest to produce objective measures to predict the human perceptibility of these errors. The perceptibility of these errors at and above a threshold is a function of many aspects or parameters of the errors and the video context in which they occur. Perceptual sensitivity to errors in video as a function of spatial frequency varies with local average luminance, duration of local stimulus (temporal extent), the associated temporal frequency content, area (spatial/angular extent) and local contrast of the original, error-free or reference, video. Likewise perceptual sensitivity to errors in video as a function of temporal frequency varies with local average luminance, temporal extent, area, associated spatial frequency content and local contrast of the original video.

Existing spatio-temporal filtering in human vision system (HVS) models is generally designed with a fixed response calibrated to one particular set of parameters i.e., spatial and temporal responses are designed to adhere to the HVS sensitivities at one particular average luminance level. Also most HVS models are based on methods of predicting the threshold of just noticeable differences (JND), such as contrast detection and discrimination thresholds. Since the HVS model component are based on mimicking behavior at threshold, behavior above threshold, i.e., at supra-threshold, is not guaranteed.

For example J. Lubin in "A Visual Discrimination Model for Imaging System Design and Evaluation", *Vision Models for Target Detection and Recognition*, ed. Eli Peli, World Scientific Publishing, River Edge, N.J. 1995, pp. 245–283, proposed a model that has a fixed spatial filter designed to match human vision system response at only one luminance level and one duration or temporal extent. There is no mechanism to create temporal frequency roll-off at spatial frequencies of peak sensitivity, so this does not match data from human vision experiments. The model proposed by Lubin has no provision for moving peaks in the spatial or temporal frequency response as a function of luminance or other parameters. Also Lubin's model is based on units of threshold, or "just noticeable difference (JND)". The only mechanism which modifies response beyond the fixed spatial and temporal filters is a masking mechanism which is a modified version of J. Foley's model for predicting contrast discrimination ("Contrast Masking in Human Vision", *Journal of the Optical Society of America*, Vol. 70, No. 12 pp.1458–1471, December 1980). However M. Canon showed ("Perceived Contrast in the Fovea and Periphery", *Journal of the Optical Society of America*, Vol. 2, No. 10 pp.1760–1768, 1985) that Foley's model is grossly in error when used to predict perceptual contrast at even moderate contrast levels above threshold. In addition Lubin's proposed model does not account for the non-linearities such as those causing the double spatial frequency and phantom pulse visual illusions. Many other human vision based models, such as that of S. Daly, "The Visible Differences Predictor: an Algorithm for the Assessment of Image Fidelity", *Digital Images and Human Vision*, ed. Andrew B. Watson, MIT Press, Cambridge, Mass. 1993, pp. 162–206, do not account for temporal aspects at all.

What is desired is a filter that is designed to match human vision system response over a range of perceptual parameters.

BRIEF SUMMARY OF THE INVENTION

Accordingly the present invention provides an adaptive spatio-temporal filter for human vision system models that is designed to match human vision response over a range of perceptual parameters. A pair of adaptive, lowpass, spatio-temporal filters are coupled in parallel to receive an input video signal, and the outputs are subtracted to provide a total output having a bandpass frequency response calibrated to a human vision system perceptual parameter. A filter adaptation controller also receives the input video signal and, based on an average luminance, generates coefficients for the respective lowpass spatio-temporal filters. Each lowpass spatio-temporal filter has a temporal IIR filter and a two-dimensional spatial IIR filter in cascade. Each of the temporal and spatial filters are composed of a common building block—a first order, unity DC gain, tunable lowpass filter. Each of the component filters receives its coefficients from the filter adaptation controller. In an alternative embodiment the filter adaptation controller receives the output of one of the lowpass spatio-adaptive filters rather than the input video signal as the basis for generating the filter coefficients.

The objects, advantages and other novel features of the present invention are apparent from the following detailed description when read in conjunction with the appended claims and attached drawing.

DETAILED DESCRIPTION OF THE INVENTION

Figure 1:
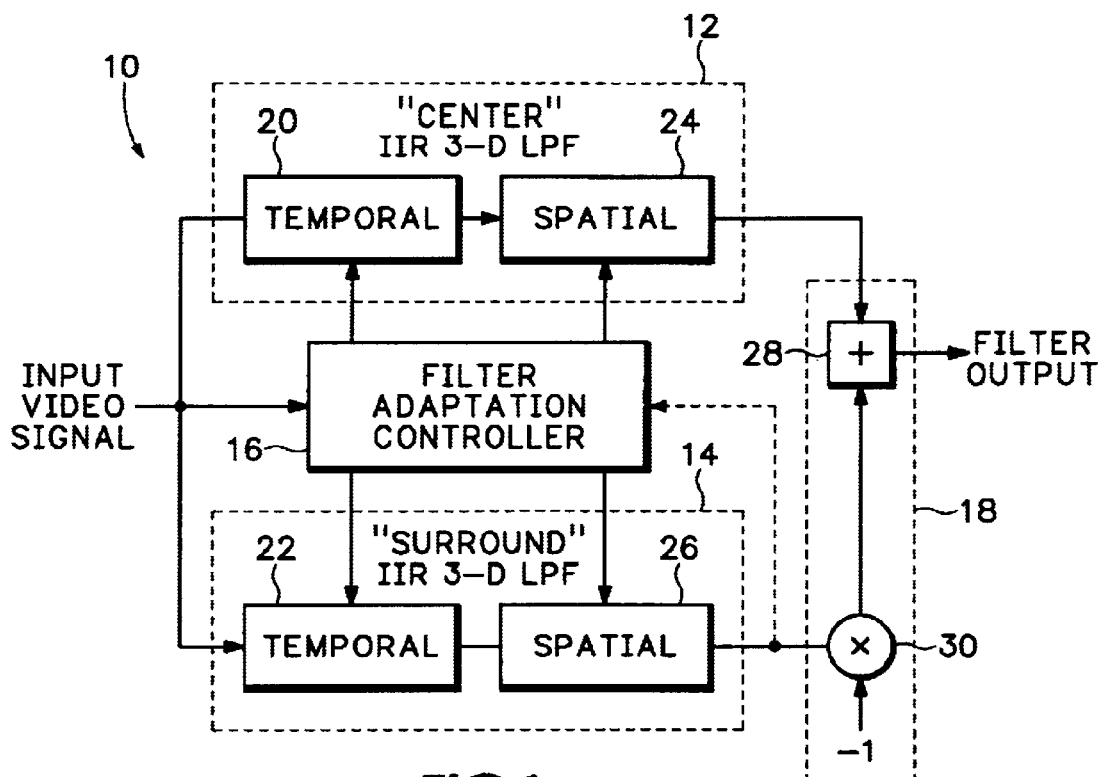
FIG. 1 is a block diagram view of an adaptive spatio-temporal filter for human vision system models according to the present invention.
Figure 3:
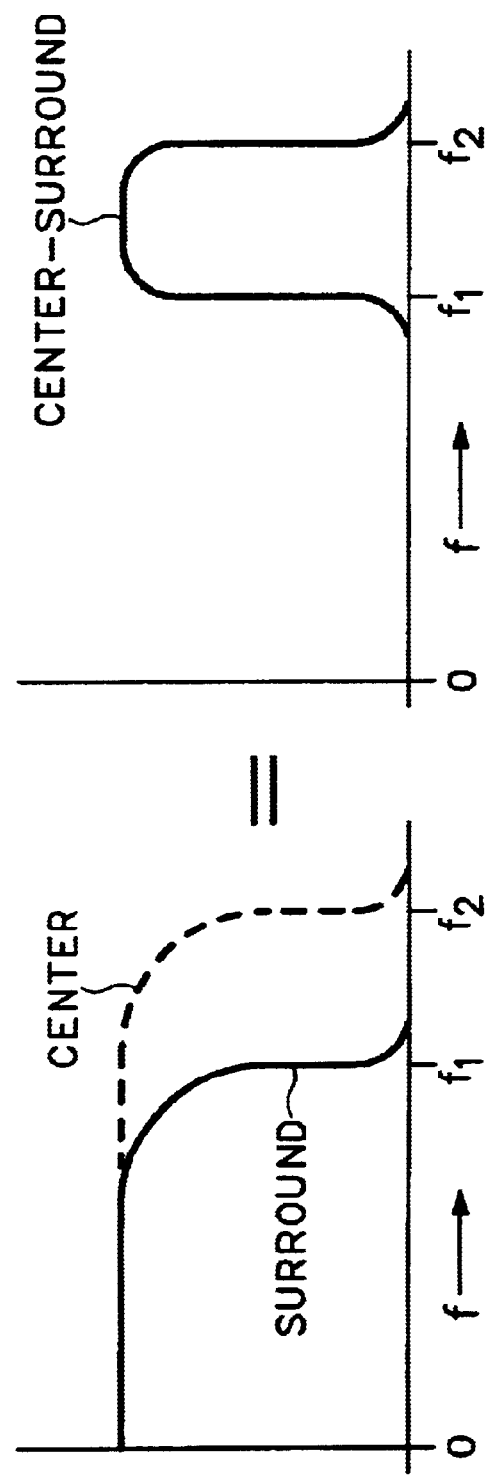
FIG. 3 is a graphic view of the frequency response of the adaptive spatio-temporal filter according to the present invention.

Referring now to FIG. 1 an adaptive three-dimensional (3-D) filter 10 is shown which improves on the prior filters for human vision system (HVS) models by combining the bulk of the accuracy of the HVS models with an efficiency comparable to non-HVS models, such as the algorithm based on weighted SNR described by T. Hamada et al (*Picture Quality Assessment System by Three-Layered Bottom-Up Noise Weighting Considering Human Visual Perception*, SMPTE Journal, January 1999, pgs. 20–26). The filter 10 has a pair of adaptive 3-D filters 12, 14, a "Center" filter and a "Surround" filter, that receive coefficients from a filter adaptation controller 16 acting as a coefficient generator. An input video signal is applied to both filters 12, 14 and the filter adaptation controller 16. The outputs from the filters 12, 14 are input to a differencing circuit 18. The output from either the Center filter 12 or the Surround filter 14 also may be input to the filter adaptation controller 16. The filter adaptation controller 16 generates filter coefficients from a perceptual parameter extracted from either the input video signal or the output of one of the adaptive 3-D filters 12, 14. Each filter 12, 14 is implemented as a cascade of an infinite impulse response (IIR) temporal lowpass filter (LPF) 20, 22 followed by a non-causal two-dimensional (2-D) IIR spatial LPF 24, 26, a filter that uses "future" data, i.e., filters both forward and backward. The differencing circuit 18 may be implemented as a summation circuit 28 and a multiplier circuit 30. The output of the Center filter 12 is one input to the summation circuit 28, while the other input is the output of the Surround filter 14 multiplied by −1 in the multiplier circuit 30. The Center filter 12 has a higher bandwidth than the Surround filter 14, with the relative filter responses being such that the resulting difference generally has a bandpass response, as shown in FIG. 3. This bandpass response is first calibrated to the contrast sensitivity response of an HVS at a particular luminance level.

Figure 2:
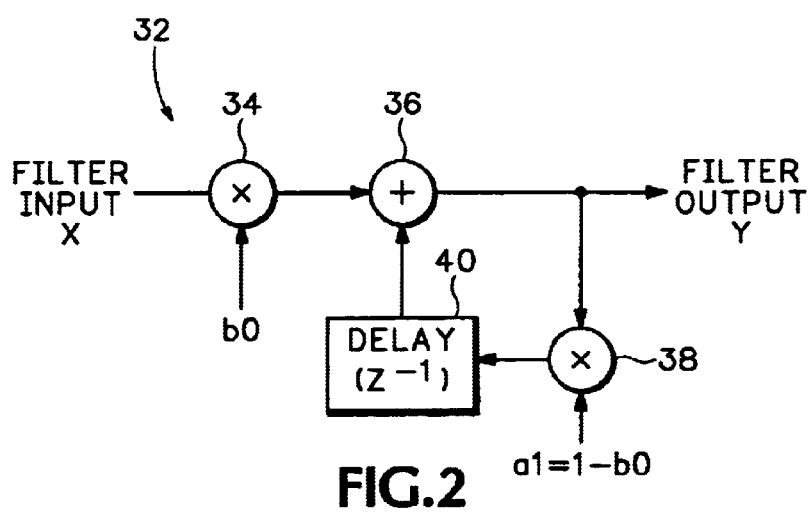
FIG. 2 is a block diagram view of a tunable IIR LP filter for use as a building block in the adaptive spatio-temporal filter according to the present invention.

The filter adaptation controller 16 is responsible for emulating the HVS adaptation to local and global changes in a perceptual parameter, such as luminance, contrast, etc., by controlling the bandwidth of each of the temporal and spatial filters 20–26. Each of these filters is composed of a common building block having a topology suitable for integrated circuit (IC) implementation—a first order, unity DC gain, tunable LPF 32 as shown in FIG. 2. The temporal filters 20, 22 use two of the tunable LPFs 32 in cascade to make a second order LPF. The spatial filters 24, 26 use two of the tunable LPFs 32 for each dimension (horizontal and vertical) and in opposite directions (right, left, up, down) to produce a zero-phase, non-causal 2-D IIR filter. The tunable LPF 32 shown is a first order discrete recursive difference equation based IIR filter, although other tunable filters may be used. An input signal X is multiplied by an input gain coefficient b0 in a multiplier circuit 34, and the result is input to a summation circuit 36. The output of the summation circuit 36 is fed back to the input of the summation circuit after being multiplied by a feedback coefficient a1 in another multiplier circuit 38 and delayed by one sample period by a delay circuit 40. The sum of the coefficients is one, i.e., b0+a1=1, and therefore the DC gain also is one regardless of the individual values of b0 (provided 0<b0≦1) and a1. This makes the filter 10 manageable since the DC gain is known when taking the difference between the Surround and Center filters 12, 14. The bandwidth and corresponding pole of the tunable LPF 32 may be raised or lowered by raising or lowering b0.

The filter adaption controller 16 supplies the tunable LPFs 32 with the appropriate b0 values at each pixel processed depending on the perceptual parameter, such as local average luminance, whether the filter is spatial or temporal, Center or Surround. The b0 values may be taken from look-up tables derived from calculating the filters to match experimental data. Alternatively they may be calculated to approximate the entries in this look-up table. The look-up table may be derived by calibrating the filters' coefficients to match experimental data. One method is to apply a linear fit to the calibrated b0 values at different luminance levels:

$$b0 = K1 + K2 * Lum \qquad (1)$$

where Lum is the local average luminance in nits (candelas/square meter).

For calibration to HVS response data taken from a range of 0.28 to 91 nits, the following values may be used, assuming for this example sampling rates of 32.0 pixels per degree and 60 samples per second:

| | | |
|---|---|---|
| spatial Center filter 24 | K1 = 0.67 | K2 = 0.00067 |
| temporal Center filter 20 | K1 = 0.54575 | K2 = 0.00295 |
| spatial Surround filter 26 | K1 = 0.225 | K2 = 0.00225 |
| temporal Surround filter 22 | K1 = 0.4125 | K2 = 0.00375 |

The filter adaptation controller 16 determines the Lum value based on either the Surround filter 14 input or output, as shown in FIG. 1. The method for determining Lum may be optimized for particular applications to balance the requirements of filter stability, number of computational operations and accuracy.

For the Lum value based on the input, X[n], to the entire filter 10 the adaptation times are controlled for accuracy by yet another filter. In each dimension Lum is obtained in the filter adaptation controller 16 by filtering according to the following equation:

$$Lum[n] = Lb0 * (X[n] - Lum[n-1]) + Lum[n-1] \qquad (2)$$

where n is the nth sample in a particular dimension and Lb0 corresponds to b0 in the HVS model. The non-linearities of the filter 10 are given by substituting the recursive equation for Lum in the equation for the tunable filters 32:

$$\begin{aligned}
y[n] &= b0 * x[n] + (1 - b0) * y[n-1] \qquad (3)\\
&= b0 * (x[n] - y[n-1]) + y[n-1]\\
&= (K1 + k2 * Lum) * (x[n] - y[n-1]) + y[n-1]\\
&= (K1 + K2 * (Lb0 * (x[n] - Lum[n-1]) +\\
&\quad Lum[n-1])) * (x[n] - y[n-1]) + y[n-1]\\
&= K1 * x[n] + (1 - K1) * y[n-1] + K2 * (Lb0 * x[n] *\\
&\quad (x[n] - y[n-1]) + (1 - Lb0) * Lum[n-1] *\\
&\quad (x[n] - y[n-1]))\\
&= (IIR\ LPF\ \text{linear response}) + (\text{Input, output product}\\
&\quad \text{terms} - \text{non-linearities})
\end{aligned}$$

Thus the output of each tunable first order IIR LPF 32 is a linear combination of a fixed linear LPF with b0=K1 and a non-linear high pass filter whose gain is controlled by the product of Lb0 and K2. Since K2 is already determined, Lb0 is chosen such that the combination of visual illusion non-linearities and adaptation times are optimally matched. For low contrast levels and/or luminance levels the filter 10 output is approximately linear, but at higher contrast and luminance levels the non-linear component becomes more substantial so that the non-linearities are consistent with enhanced perceived brightness.

For speed improvement the Lum filter may be eliminated (Lb0=1) and the single adaptive filter response is:

$$y[n] = K1 * x[n] + (1-K1) * y[n-1] + K2 * (x[n] * (x[n] - y[n-1]))$$

The Lum value may be based on the output from the Surround filter 14. In the case where speed is more desirable, no additional filtering is used:

$$Lum[n-1] = y_s[n-1]$$

Other calculation alternatives for y[n] may be based on this equation by substitution into equation (3).

Stability considerations limit the values of Lb0 that are possible if y[n] represents an individual filter output of the Surround LPF 14. Also other perceptual parameters besides local average luminance, such as contrast, etc. may be used by the filter adaptation controller 16 to generate the filter coefficients.

Figure 4:
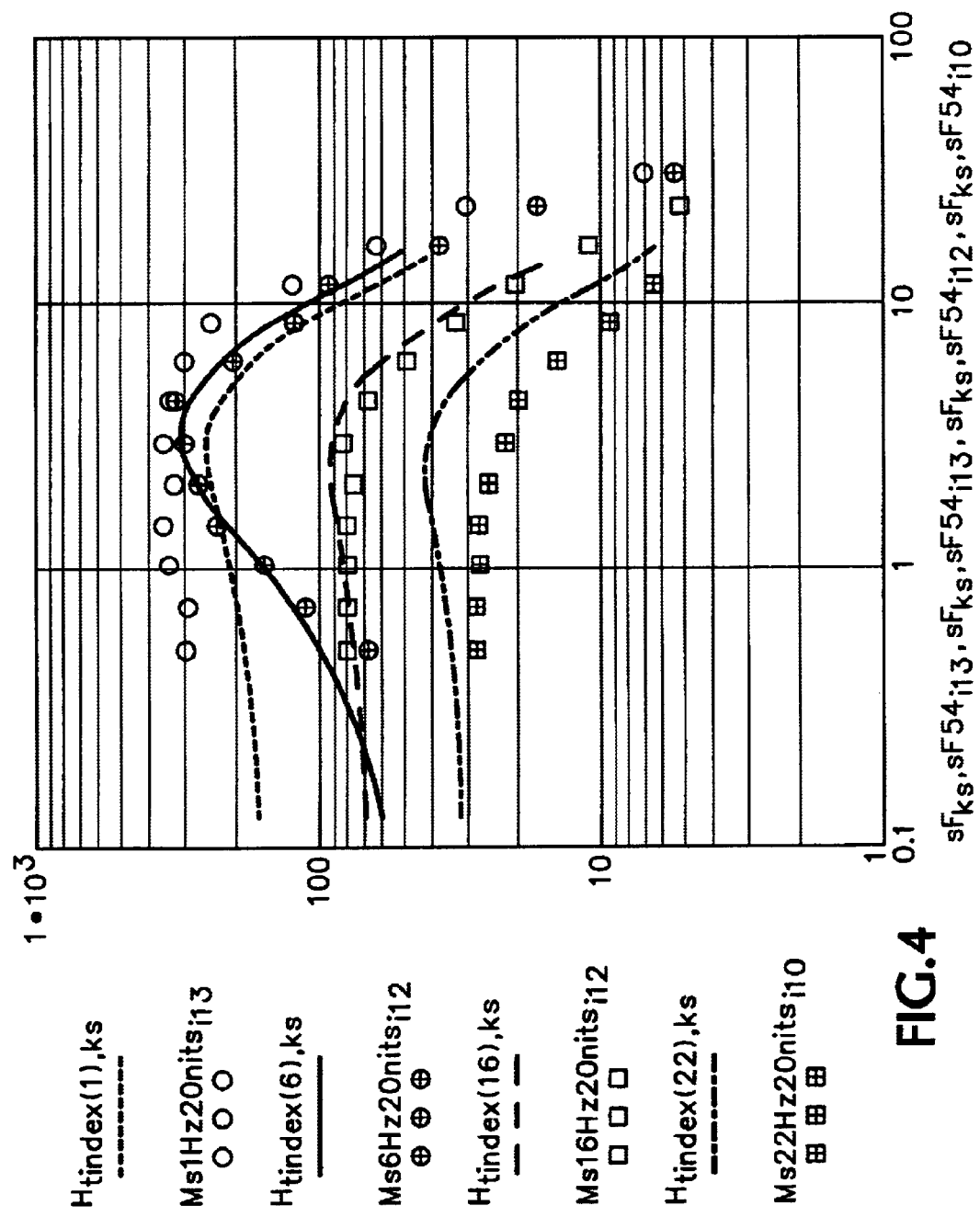
FIG. 4 is a graphic view comparing HVS experimental data with the response of the adaptive spatio-temporal filter as a function of spatial frequency according to the present invention.
Figure 5:
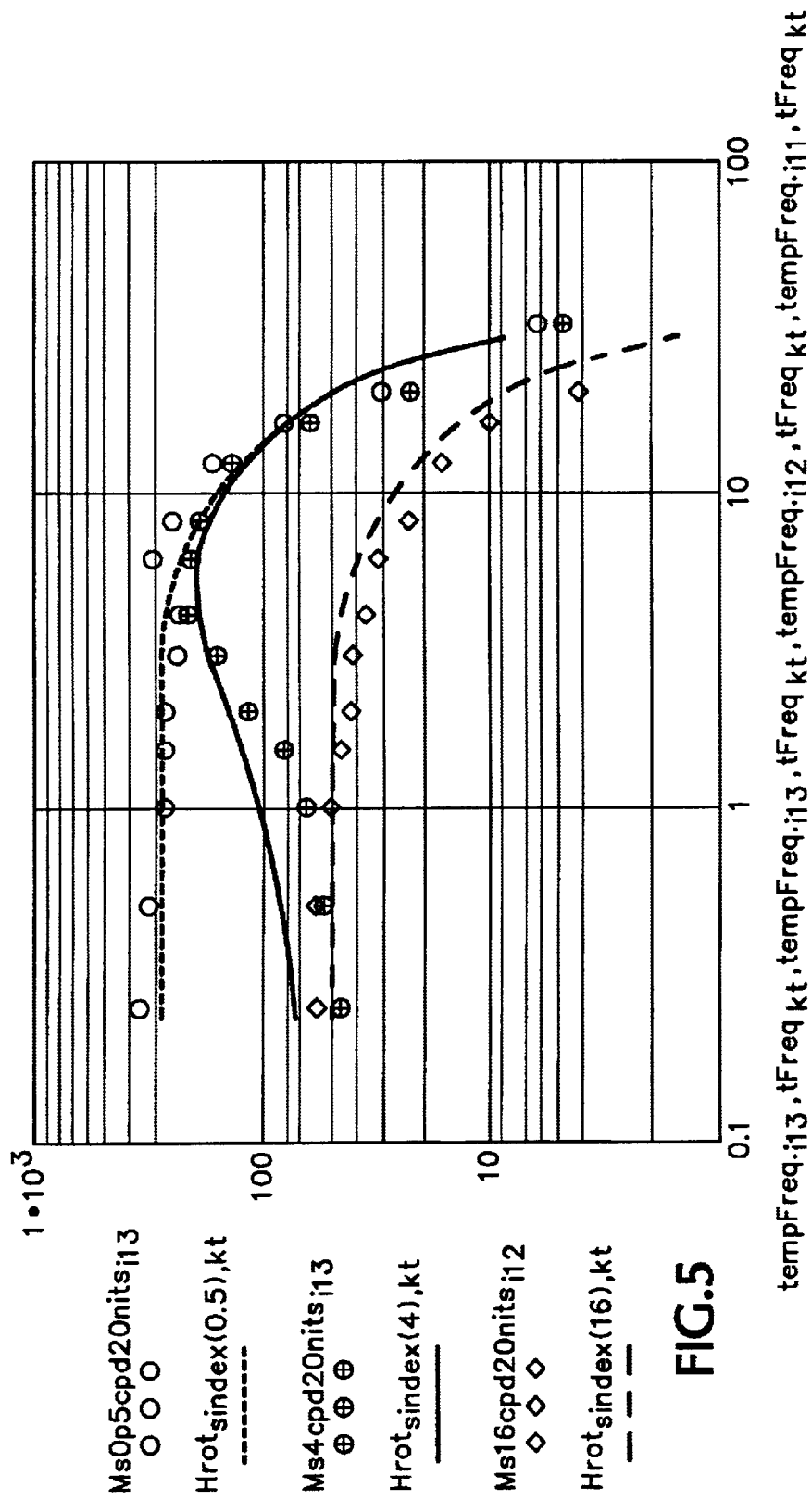
FIG. 5 is a graphic view comparing HVS experimental data with the response of the adaptive spatio-temporal filter as a function of temporal frequency according to the present invention.

Test results show a match between human vision system response and the adaptive spatio-temporal filter response, as shown in FIGS. 4 and 5 for an average luminance of 20 nits. FIG. 4 is a plot of modulation sensitivity versus spatial frequency with the human vision system model results (Ms#Hz20 nits) being shown as circles or boxes and the corresponding filter response ($H_{tindex(\#),ks}$) being shown as lines. Likewise FIG. 5 is a corresponding plot of modulation sensitivity versus temporal frequency at the same luminance level (20 nits) with the human vision system model results (Ms#cpd20 nits) being shown as circles or diamonds and the corresponding filter response ($Hrot_{sindex(\#),kt}$) being shown as lines. Also rectification of the output is consistent with brightness enhancement in intermittent light, an effect that increases with increasing average luminance with corresponding peaks at increasing temporal frequencies. The behavior of the adaptive spatio-temporal filter 10 is consistent with data from other human vision experiments including: threshold of perception as in discrimination; suprathreshold temporal contrast perception; perceived spatial frequency including frequency aliasing/doubling; perceived temporal frequency including flickering, etc. perceived velocity in both speed and direction; perceived phantom noise including noise, residual images, extra/missing pulses, etc. neural response including voltage waveforms, etc. and additional sensitivity experiments involving changes in: mean luminance; angular extent or size of target image on retina; orientation including rotational, both of target image pattern an masker; spatial frequency for both target and masker; temporal frequency of both target image pattern and masker; duration or temporal extent; and surround or lateral masking effects. masker; duration or temporal extent; and surround or lateral masking effects.

Thus the present invention provides an adaptive spatio-temporal filter for human vision system models that has a pair of spatio-temporal filters in parallel with overlapping bandwidths such that the difference of the outputs produces a band pass response, each filter being composed of common adaptive, unity DC gain, tunable lowpass filters having a linear lowpass response portion and a non-linear high-pass response portion, with the filter coefficients being determined for each pixel processed from a perceptual parameter, such as local average luminance, contrast, etc., to produce a result consistent with experimental results of human vision system models.

What is claimed is:

1. An adaptive spatio-temporal filter for human vision system models comprising:

means for lowpass spatio-temporal filtering with a first bandwidth an input video signal to produce a first filtered output;

means for lowpass spatio-temporal filtering with a second bandwidth that spans the first bandwidth the input video signal to produce a second filtered output;

means for generating adaptive filter coefficients for both of the lowpass spatio-temporal filtering means as a function of a perceptual parameter of the input video signal, the adaptive filter coefficients being used to control the first and second bandwidths in order to adapt to local and global changes in the perceptual parameter; and means for obtaining a difference between the first and second filtered outputs to produce an output for the adaptive spatio-temporal filter, the difference having a bandpass response for the input video signal calibrated to a perceptual response of the human vision system models.

2. The filter as recited in claim 1 wherein each of the lowpass spatio-temporal filtering means comprises:

a temporal filter; and a two-dimensional spatial filter cascaded with the temporal filter.

3. The filter as recited in claim 2 wherein each temporal and spatial filter comprises at least two units of a common building block having a filter response with a linear portion and a non-linear portion.

4. The filter as recited in claim 3 wherein the common building block comprises a first order, unity DC gain, tunable filter.

5. The filter as recited in claim 4 wherein the first order, unity DC gain, tunable filter comprises:

means for multiplying an input signal with a first filter coefficient to produce a first product;

means for multiplying an output of the first order, unity DC gain, tunable filter with a second filter coefficient to produce a second product, the sum of the first and second filter coefficients being unity; and means for summing the first and second products to produce the output of the first order, unity DC gain, tunable filter, the second product being delayed relative to the first product.

6. The filter as recited in claim 1 wherein the perceptual parameter is derived directly from the input video signal.

7. The filter as recited in claim 1 wherein the perceptual parameter is derived from one of the first and second filtered outputs.

8. A method of adaptive spatio-temporal filtering for human vision system models comprising the steps of:

lowpass spatio-temporal filtering with a first bandwidth an input video signal to produce a first filtered output;

lowpass spatio-temporal filtering with a second bandwidth that spans the first bandwidth the input video signal to produce a second filtered output;

generating adaptive filter coefficients for both of the lowpass spatio-temporal filtering steps as a function of a perceptual parameter of the input video signal, the adaptive filter coefficients being used to control the first and second bandwidths in order to adapt to local and global changes in the perceptual parameter; and obtaining a difference between the first and second filtered outputs to produce an adaptive spatio-temporal filtering output, the difference having a bandpass response calibrated to a perceptual response of the human vision system models.

9. The method as recited in claim 8 wherein each lowpass spatio-temporal filtering step comprises the steps of:

temporal filtering the input video signal to produce a temporal filter output; and two-dimensionally spatial filtering the temporal filter output to produce first and second filtered outputs.

10. The method as recited in claim 9 wherein each temporal and spatial filtering step comprises the step of using at least two units of a common building block in cascade for each dimension, each unit having a linear response portion and a non-linear response portion as determined by the adaptive filter coefficients 11. The method as recited in claim 10 wherein the common building block comprises a first order, unity DC gain, tunable filter.

12. The method as recited in claim 8 wherein the perceptual parameter is derived directly from the input video signal.

13. The method as recited in claim 8 wherein the perceptual parameter is derived from one of the first and second filtered outputs.

* * * * *